United States Patent
Boon et al.

(10) Patent No.: US 9,652,854 B2
(45) Date of Patent: May 16, 2017

(54) SYSTEM AND METHOD FOR IDENTIFYING AN OBJECT IN AN IMAGE

(71) Applicant: BENDIX COMMERICAL VEHICLE SYSTEMS LLC, Elyria, OH (US)

(72) Inventors: Cathy L Boon, Orange, CA (US); Zheng Li, Irvine, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 14/683,113

(22) Filed: Apr. 9, 2015

(65) Prior Publication Data

US 2016/0300357 A1    Oct. 13, 2016

(51) Int. Cl.
| G06T 7/00 | (2017.01) |
| G06T 7/11 | (2017.01) |
| G06T 7/143 | (2017.01) |
| G06T 7/174 | (2017.01) |
| G06T 7/194 | (2017.01) |
| G06T 7/136 | (2017.01) |

(52) U.S. Cl.
CPC ............ *G06T 7/0081* (2013.01); *G06T 7/11* (2017.01); *G06T 7/136* (2017.01); *G06T 7/143* (2017.01); *G06T 7/174* (2017.01); *G06T 7/194* (2017.01); *G06T 2207/10016* (2013.01)

(58) Field of Classification Search
None
See application file for complete search history.

(56) References Cited

U.S. PATENT DOCUMENTS

| 5,589,980 A | 12/1996 | Bass et al. |
| 6,290,359 B1 | 9/2001 | Shriver |
| 6,542,621 B1 | 4/2003 | Brill et al. |
| 6,658,136 B1 | 12/2003 | Brumitt |
| 6,891,968 B2 | 5/2005 | Janardhanan |

(Continued)

OTHER PUBLICATIONS

Wikipedia—"Background subtraction"—waybackmachine internet archive date of Dec. 24, 2013.*

(Continued)

*Primary Examiner* — Bernard Krasnic
(74) *Attorney, Agent, or Firm* — Brian E. Kondas; Cheryl L. Greenly; Eugene E. Clair (57) ABSTRACT

A method for processing image data includes identifying a background scene in a background frame of an image. Each of a plurality of pixel locations in the background frame is set as a respective background pixel. For each of the pixel locations, a respective running mean and a respective running variance are determined based on a brightness component of the background frame at the pixel location. A subsequent frame is identified as a current frame. For each of the pixel locations in the current frame identified as a background pixel, the running mean is updated based on one of a plurality of mean weights and the running variance is updated based one of a plurality of variance weights. For each of the pixel locations in the current frame, an identification is made if the current pixel location is one of a background pixel and a foreground pixel based on a brightness component of the current pixel location in the current frame, the running mean of the current pixel location, and the running variance of the current pixel location.

10 Claims, 7 Drawing Sheets

(56) References Cited

U.S. PATENT DOCUMENTS

| | | | |
|---|---|---|---|
| 7,330,191 | B2 | 2/2008 | Bhattacharjya |
| 7,783,075 | B2* | 8/2010 | Zhang ............... G06K 9/00228 382/103 |
| 7,903,141 | B1 | 3/2011 | Mariano et al. |
| 8,212,929 | B2 | 7/2012 | Chiang |
| 8,265,380 | B1 | 9/2012 | Bvn |
| 8,639,026 | B2 | 1/2014 | Lin |
| 8,711,061 | B2 | 4/2014 | Reichow et al. |
| 8,861,867 | B2 | 10/2014 | Bvn |
| 8,929,592 | B2 | 1/2015 | Marks et al. |
| 2007/0286520 | A1* | 12/2007 | Zhang ............... G06K 9/00228 382/264 |
| 2008/0181499 | A1 | 7/2008 | Yang et al. |
| 2008/0181507 | A1 | 7/2008 | Gope et al. |
| 2008/0205703 | A1 | 8/2008 | Brown et al. |
| 2008/0285859 | A1 | 11/2008 | Lei et al. |
| 2009/0060354 | A1 | 3/2009 | Xiao et al. |
| 2009/0066841 | A1 | 3/2009 | Chiang |
| 2010/0150471 | A1 | 6/2010 | Cobb et al. |
| 2011/0280478 | A1 | 11/2011 | Chen et al. |
| 2012/0019728 | A1 | 1/2012 | Moore |
| 2012/0188234 | A1 | 7/2012 | Ortega et al. |
| 2013/0129206 | A1 | 5/2013 | Worthington et al. |
| 2013/0242095 | A1 | 9/2013 | Lipton et al. |
| 2013/0243240 | A1 | 9/2013 | Marks et al. |
| 2014/0003713 | A1 | 1/2014 | Seow et al. |
| 2014/0003720 | A1 | 1/2014 | Seow et al. |
| 2014/0056472 | A1 | 2/2014 | Gu |
| 2014/0247980 | A1 | 9/2014 | Bvn |

OTHER PUBLICATIONS

Morales, J.—"Video Background Subtraction in Complex Environments"—Jun. 2014, Journal of Applied Research and Technology, vol. 12, pp. 527-537.*
Ducao, A.B.—"Human Activity Classification Based on Gait and Support Vector Machines"—Master of Science Thesis 2008, pp. i-viii and 1-50.*
Piccardi, M.—"Background subtraction techniques: a review"—IEEE 2004, pp. 3099-3104.*
Borghgraef, A.—"An Evaluation of Pixel-Based Methods for the Detection of Floating Objects on the Sea Surface"—EURASIP 2010, pp. 1-11.*
Notification of Transmittal of The International Search Report and The Written Opinion of the International Searching Authority, or the Declaration issued in counterpart International Application No. PCT/US2016/026175, mailed Jul. 5, 2016 (1 page).
International Search Report issued in counterpart International Application No. PCT/US2016/026175, mailed Jul. 5, 2016 (6 pages).
Written Opinion of the International Searching Authority issued in counterpart International Application No. PCT/US2016/026175, mailed Jul. 5, 2016 (8 pages).
Stauffer, C. et al., "Adaptive background mixture models for real-time tracking", Proceedings of the 1999 IEEE Computer Society Conference on Computer Vision and Pattern Recognition, Jun. 23-25, 1999; Fort Collins, Colorado, IEEE, The Institute of Electrical and Electronics Engineers, Inc, US, vol. 2, dated Jun. 23, 1999 (Jun. 23, 1999), pp. 246-252.
Wren, C et al., "Pfinder: real-time tracking of the human body", Automatic Face and Gesture Recognition, 1996, Proceedings of the Second International Conference on Killington, VT, USA Oct. 14-16, 1996, Los Alamitos, CA, USA, IEEE Comput. Soc. US, dated Oct. 14, 1996 (Oct. 14, 1996), pp. 51-56.
Bertolino, P. et al., "Detecting people in videos for their immersion in a virtual space", ISPA. Proceedings of the International Symposium on Image and Signal Processing and Analysis, XX, XX, dated Jan. 1, 2001 (Jan. 1, 2001), pp. 313-318, XP00237690.
Thongkamwitoon, T. et al., "Non-Linear Learning Factor Control for Statistical Adaptive Background Subtraction Algorithm", Conference Proceedings / IEEE International Symposium on Circuits and Systems (ISCAS) : May 23-26, 2005, International Conference Center, Kobe, Japan, IEEE Service Center, Piscataway, NJ, dated May 23, 2005 (May 23, 2005), pp. 3785-3788.
Shah, M. et al., "Enhancing the mixture of Gaussians background model with local matching and local adaptive learning", Image and Vision Computing New Zealand, ACM, 2 Penn Plaza, Suite 701 New York NY 10121-0701 USA, Nov. 26, 2012 (Nov. 26, 2012), pp. 103-108.
Hall, D. et al., "Comparison of Target Detection Algorithms using Adaptive Background Models", Visual Surveillance and Performance Evaluation of Tracking and Surveillance, 2005. 2nd Joint IEEE International Workshop on Beijing, China Oct. 15-16, 2005, Piscataway, NJ, USA, IEEE, dated Oct. 15, 2005 (Oct. 15, 2005), pp. 113-120.
Bouwmans, T. et al., "Background Modeling using Mixture of Gaussians for Foreground detection—A Survey", Recent Patents on Computer Science, vol. 1, No. 3, dated Jan. 9, 2010 (Jan. 9, 2010), pp. 219-237.

\* cited by examiner

SYSTEM AND METHOD FOR IDENTIFYING AN OBJECT IN AN IMAGE

BACKGROUND

The present invention relates to distinguishing image pixels that relate to a background from image pixels that relate to a foreground object. It finds particular application in conjunction with identifying changes to an area monitored by a video camera and will be described with particular reference thereto. It will be appreciated, however, that the invention is also amenable to other applications.

Visually monitoring an area for changes over time is desirable in some situations since such visual changes may indicate an investigation of the area is warranted. For example, a person suddenly appearing in a scene of an empty warehouse corridor may indicate a theft is imminent. Similarly, a change in a scene of a tank containing a fluid may indicate a leak has occurred.

Some methods used for recognizing changes in a monitored area identify the monitored area as a background and any changes to the monitored area (e.g., a person entering the empty warehouse corridor or fluid leaking from a tank) as a foreground object. One conventional method for recognizing changes in a monitored area involves first learning the background based on a sequence of images. The background is then subtracted from a future image, which results in an image including the foreground object. Some issues arise when implementing conventional background subtraction algorithms. For example, the background may not be correctly learned and/or updated, the foreground object may not be correctly determined, a pixel may be erroneously labelled as foreground, and significant changes in a pixel's exposure may cause pixels to be incorrectly labeled as foreground.

The present invention provides a new and improved apparatus and method which addresses the above-referenced problems.

SUMMARY

In one aspect of the present invention, it is contemplated that a method for processing image data includes identifying a background scene in a background frame of an image. Each of a plurality of pixel locations in the background frame is set as a respective background pixel. For each of the pixel locations, a respective running mean and a respective running variance are determined based on a brightness component of the background frame at the pixel location. A subsequent frame is identified as a current frame. For each of the pixel locations in the current frame identified as a background pixel, the running mean is updated based on one of a plurality of mean weights and the running variance is updated based one of a plurality of variance weights. For each of the pixel locations in the current frame, an identification is made if the current pixel location is one of a background pixel and a foreground pixel based on a brightness component of the current pixel location in the current frame, the running mean of the current pixel location, and the running variance of the current pixel location.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
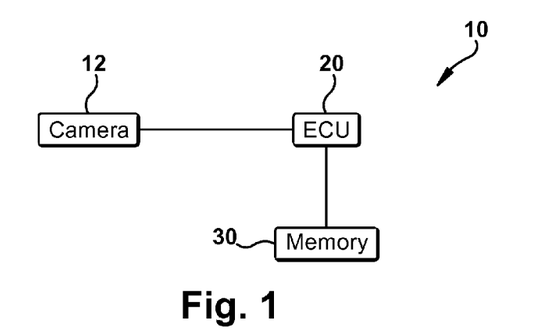
FIG. 1 illustrates a schematic representation of a system in accordance with one embodiment of an apparatus illustrating principles of the present invention.
Figure 2:
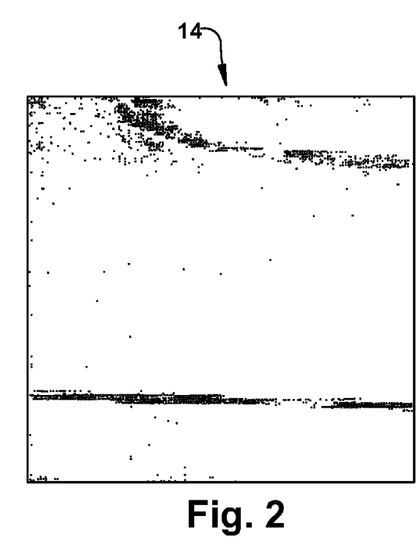
FIG. 2 illustrates a background image in accordance with one embodiment of an apparatus illustrating principles of the present invention.
Figure 3:
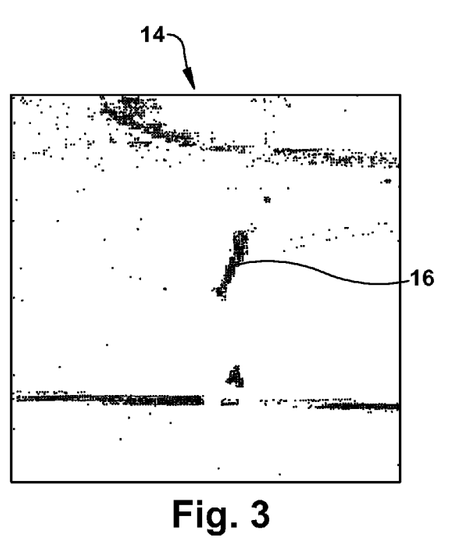
FIG. 3 illustrates the image with a foreground object in accordance with one embodiment of an apparatus illustrating principles of the present invention.

With reference to FIGS. 1-3, a system 10 for monitoring an area includes an image capturing device 12 (e.g., a camera such as a video camera) which monitors an area of interest 14 (see FIGS. 2 and 3). For purposes of discussion, it is assumed the area of interest 14 is initially "empty" (see FIG. 2). In other words, it is assumed that the area of interest 14 initially does not include any atypical objects 16 (see FIG. 2 vs. FIG. 3).

A processing device 20 (e.g., an electronic control unit (ECU)) is electrically connected to the camera 12. The camera 12 obtains sequential images (e.g., frames) of the area of interest 14. In one embodiment, the frames are obtained by the camera 12 at predetermined time intervals. Therefore, when viewed sequentially, the frames captured by the camera 12 provide a video image of the area of interest 14 over a time period.

The ECU 20 evaluates each frame and determines any significant changes relative to the image from at least one of the previous frames. In this manner, the ECU 20 learns what the area of interest 14 looks like without any atypical object 16 (see FIG. 2). Significant changes to the image from one frame to another are flagged as changes in the appearance of the area of interest 14 (see FIG. 3).

In the illustrated embodiment, the area of interest 14 is an empty scene (FIG. 2). As the scene 14 is monitored, the ECU 20 "learns" what the empty scene 14 looks like. When the ECU 20 detects a frame that looks different the 'learned' empty scene, the ECU 20 identifies the change in the image as an atypical object 16 in the area of interest 14. In one embodiment, it is assumed that discovery of an atypical object 16 requires action be taken. For example, the atypical object 16 may be identified as an unauthorized person (e.g., a thief) in a restricted area 14. In this case, the ECU 20 may cause an alarm to be triggered. In the embodiments discussed below, the learned, expected appearance of the area of interest 14 (e.g., the empty corridor) is referred to as background and deviations from the background are referred to as foreground.

An algorithm for background subtraction, which may be used by the ECU 20 for "learning" the background associated with an image is discussed below.

First, the ECU 20 computes a respective representative statistic of the brightness component (e.g., a mean brightness value) for each pixel location in the sequence of video frames. Second, a representative statistic of the variability of the brightness component for each pixel location is computed for the same sequence of video frames. The representative statistic of variability has a larger value when the statistic of the brightness component for a respective pixel location changes significantly over time and a smaller value when the statistic of brightness component is fairly constant over time. Third, pixel locations in the image having a deviation greater than a predetermined value from the statistic of brightness component are labeled as foreground. In one embodiment, the labelling method depends on three scalar values: 1) the squared difference between the most recent brightness measurement and the mean brightness statistic value, 2) a threshold, and 3) a factor times the variability statistic value. In this embodiment, the labelling method may require that, in order for a pixel location to be identified as foreground, the first scalar value must be greater than both the second and third scalar values. Fourth, the first and second steps are limited so that the representative statistics for a pixel location are not altered when that pixel location is identified as foreground. In this manner, the statistics computed consistently represent background characteristics. The limiting method could use an array called a foreground mask, which contains an element corresponding to each image pixel location. Each element is a first value (e.g., zero (0)) when a pixel location is labeled as background and a second value (e.g., one (1)) when that pixel location is labeled as foreground.

The first and second steps discussed above are referred to as adaptive background estimation. The representative statistics are chosen to provide stable estimations which characterize the value and the variability of the brightness component of each pixel location while, at the same time, are also able to adapt to slow changes in pixel location brightness (such as might occur from changing lighting). One statistic that accommodates slow variations in pixel location brightness is an exponentially-weighted (EW) running mean. A companion statistic is the EW running variance, which can be used in conjunction with the EW running mean when deciding whether an observed deviation is statistically significant.

In a commonly used implementation, the EW running mean and EW running variance are updated for those pixel locations where the foreground mask is zero. The EW running mean and the EW running variance are determined as:

updatedMean=(1−weight$M$)*previousMean+
weight$M$*newestData; and updatedVar=(1−weight$V$)*previousVar+weight$V$*
(newestData−previousMean).

The foreground mask contains an element corresponding to each image pixel location. Each element is a first value when a pixel location is labeled as background and a second value when that pixel location is labeled as foreground. The following method is commonly used for determining the foreground mask:

1) Mask any pixel location that was identified as foreground in the previous image.

Some issues arise when implementing the method described above in practical situations:

1. When the foreground mask is determined using the method described above, considering that some of the pixel locations within a foreground object may not be correctly identified in a given frame, any such foreground pixel locations will not be masked in the following frame and the running mean and variance will be adversely affected.

2. A pixel location may erroneously be labelled as foreground. If, as in the method described above, pixel locations labeled as foreground are never updated, such incorrect labeling of the pixel location will persist.

3. As a foreground object moves through the scene, an area of the background may be obscured by that object for a significant time, such that, when that background area is no longer obscured by the foreground object, the scene characteristics and/or camera exposure may have changed and background mean and variance values in that area may be obsolete.

4. When the sequence of frames presented for evaluation is being generated by a dynamically controlled imaging device, sudden, significant changes in imager exposure may have excessive influence on the EW running mean and the EW running variance estimations and/or may cause pixel locations to be incorrectly labeled as foreground because of a sudden, large difference between the current pixel location brightness and the EW running mean value.

Three enhancements are proposed to the above-described approach.

1. Determining the foreground mask. A method according to one embodiment of the present invention addresses issue 1 above:

When updating the EW running mean values, a "foreground mask A" is used which includes each pixel location determined to be foreground in the previous image. In one embodiment, "foreground Mask A" may also include any neighbor of any such foreground pixel location. A neighbor of a pixel location is any other pixel location directly adjacent to that pixel location (e.g., touching the pixel location either at an edge or at a corner). The process of identifying and including all of the neighbors of all of the foreground pixel locations is referred to as dilation.

When updating the EW running variance values, a "foreground mask B" is used which includes any pixel location that is within a bounding box surrounding each grouping of foreground pixel locations, or object, identified in the previous image. The bounding box may be described as any geometric shape which includes every pixel location in a grouping of foreground pixel locations and any background pixel locations within and around that grouping. In one embodiment, the bounding box may be a rectangular area of an image having a left edge at the image column containing the leftmost object pixel location, a right edge at the image column containing the rightmost object pixel location, a top edge at the image row containing the topmost object pixel location, and a bottom edge at the image row containing the bottommost object pixel location.

2. Computing the EW running mean. In one embodiment of the present invention, a more complex logic is used to determine the EW running mean:

If the foreground mask A value is zero:

i. If the foreground mask A value for that pixel location in the previous frame was non-zero, update the EW running mean using a faster filter (larger weightM value), OR     ii. If the exposure has changed significantly between the previous and the current frames, update the running mean using a faster filter (larger weightM value), OR iii. Update the running mean as described above: updatedMean=(1−weightM)*previousMean+weightM*newestData.

If the foreground mask A value is 1 (one): If the exposure has changed significantly between the previous and the current frames, update the EW running mean. In this case, the update may use the nominal weightM value, or some other pre-defined value.

In one embodiment, the larger weightM value used in (i) or (ii) above could be set equal to one (1), in which case the EW running mean values would be re-initialized to the this frame pixel location brightness values.

3. Computing the EW running variance. In one embodiment, the EW running variance is computed as:

If the exposure has changed significantly between the previous and the current frames, do not update the EW running variance of any pixel location in this frame time, OR At pixel locations where the appropriate foreground mask (e.g., the foreground mask B) is zero, update the running variance as described above: updatedVar=(1−weight)*previousVar+weight*(newestData−previousMean)$^2$.

The embodiments of the present invention for determining the foreground mask(s) address the first issue described above of determining the foreground mask. The process of dilating each detected foreground pixel location when building the foreground mask A masks some pixel locations as foreground that may have gone undetected and prevents those values from adversely affecting the EW running mean and EW running variance at those pixel locations. The foreground mask B that is used when updating the EW running variance considers even more pixel locations to be foreground. This results in keeping the EW running variance more stable because the EW running variance statistic is quite sensitive to mistakenly included foreground pixel locations.

The embodiments of the present invention for determining the EW running mean also address the second issue that an area of the background may be obscured as a foreground object moves through the scene, the third issue that a pixel location may erroneously be labelled as foreground, and the fourth issue of sudden, significant changes in imager exposure, which were discussed above. Using a larger weightM to update the EW running mean when a pixel location transitions from foreground to background helps to remove any effects of foreground that may have "leaked" into that value, and also helps keep pace with changes due to dynamic background conditions and/or exposure changes that may have occurred while the pixel location was labeled as foreground. Using a faster filter in a frame where the exposure has significantly changed helps to minimize incorrect labeling of pixel locations as foreground because of a sudden, large difference between pixel location brightness and EW running mean.

The embodiments of the present invention for determining the EW running variance address the fourth issue of sudden, significant changes in imager exposure, which was discussed above. A sudden change in imager exposure results in generally large changes in all pixel location values within the image. This difference is amplified in (newestData−previousMean)$^2$, which is used to update EW running variance. Disabling the update of EW running variance in a frame where the exposure has significantly changed helps to minimize the effect of exposure changes in the EW running variance.

The embodiments of the present invention result in a more accurate separation of background and foreground, reduced sensitivity to changing camera settings, such as exposure time, and reduced persistence of incorrectly labeled foreground areas.

With reference to FIGS. 4-8, an exemplary methodology of the system and method described above is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

It is assumed FIG. 2 illustrates the area of interest 14 including the background scene. This background scene is assumed to occur in frame zero (0) (Image 0 or background frame), which occurs at time zero (0). The object 16 appears in the image of FIG. 3 in frame one (1) (Image 1), which occurs at time one (1) (e.g., after time zero (0)). The frame 0 and frame 1 are sequential frames that are part of a plurality frames defining a video image.

With reference to FIGS. 4-8, the method starts in a step 110. The frame 0 (Image 0) is selected as a current frame in a step 112. For each of the pixel locations 22 in the current frame (e.g., Image 0), a respective EW running mean is set (e.g., updated) in a step 114, a respective EW running variance is set (e.g., updated) in a step 116, and a respective determination is made in a step 120 whether the pixel location 22 is a "foreground pixel" or a "background pixel".

Figure 4:
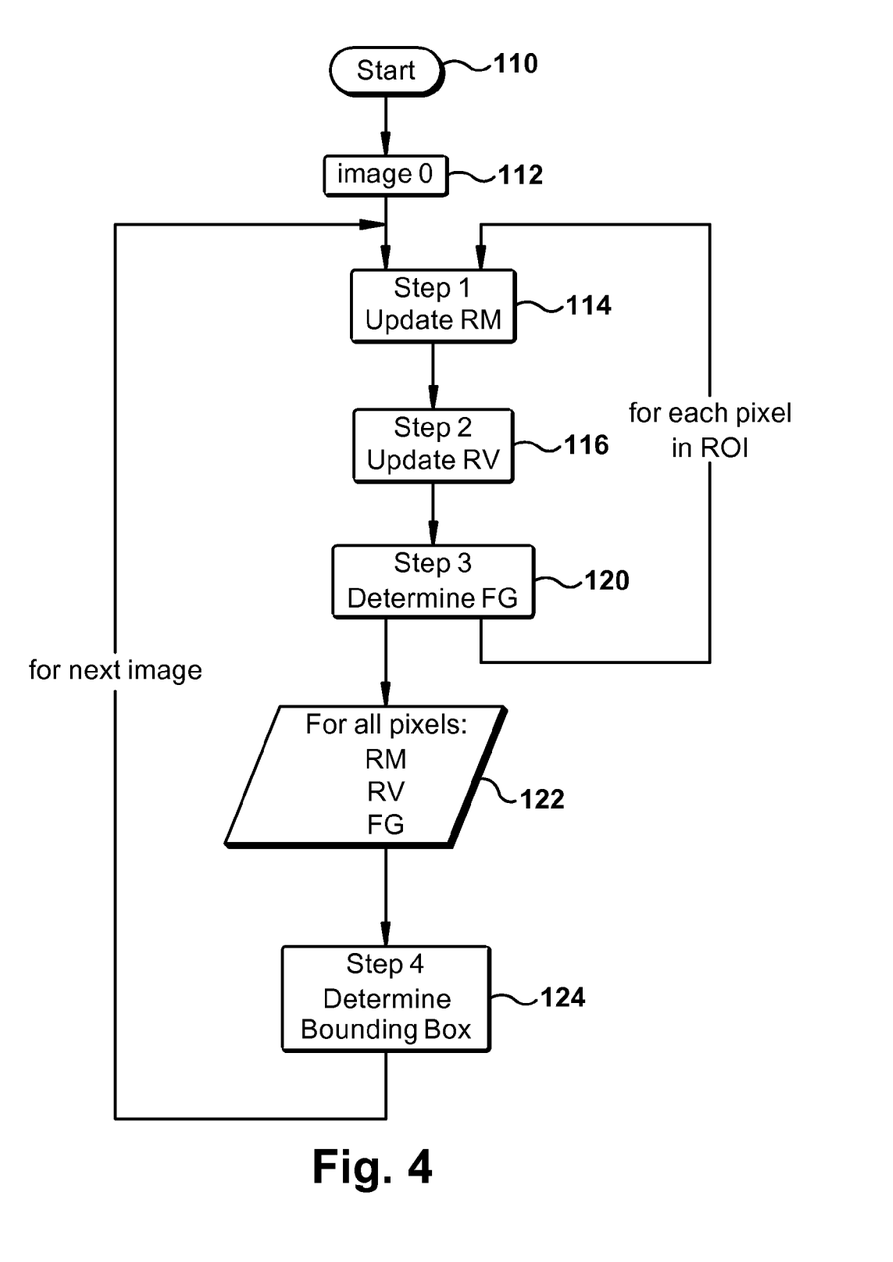
FIGS. 4-8 are exemplary methodologies of identifying an object in an image in accordance with one embodiment illustrating principles of the present invention.
Figure 5:
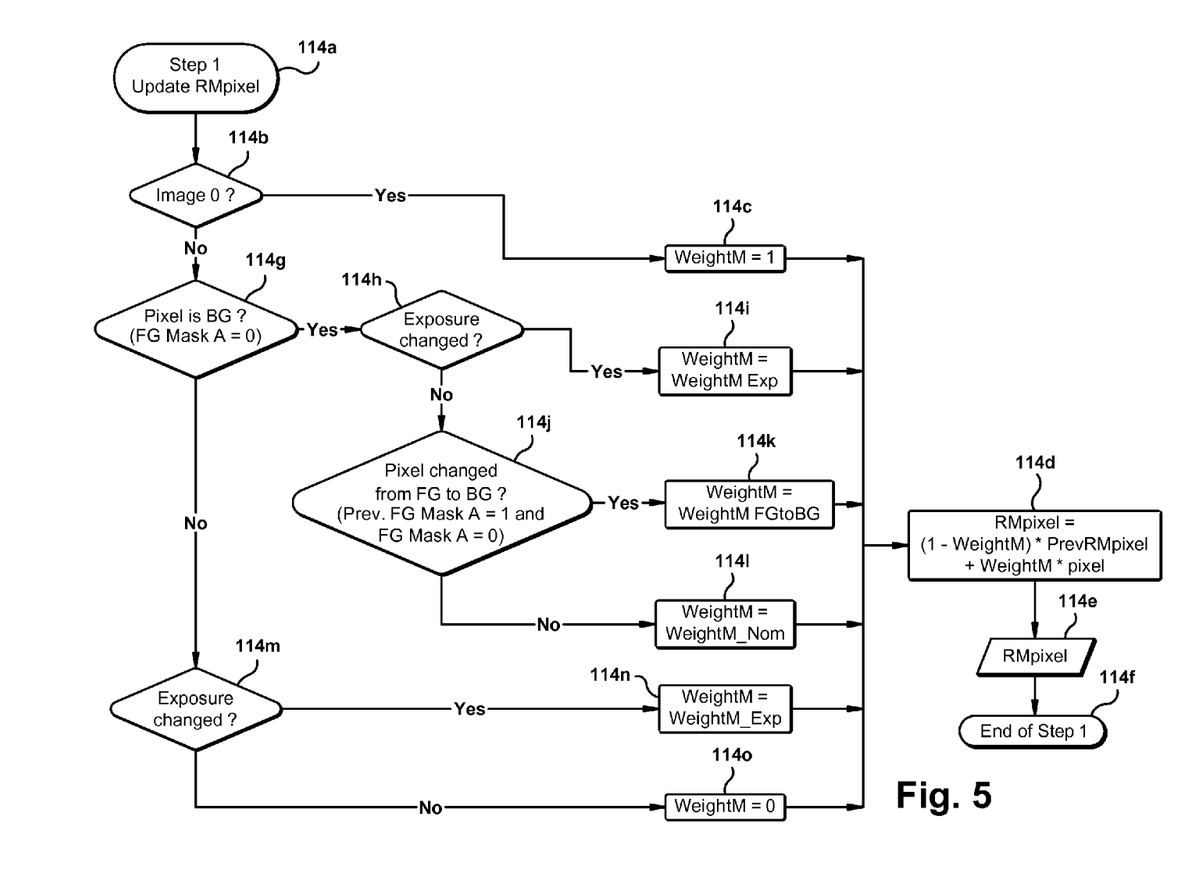

With reference to FIGS. 4 and 5, the step 114 of setting (e.g., updating) the respective EW running mean for the current pixel location 22 starts in a step 114a. A determination is made in a step 114b whether the current frame being evaluated in the first frame (e.g., Image 0). Since, at this stage, the current frame is Image 0, control passes to a step 114c for assigning a running mean weighting variable WeightM, which is used for determining the running mean of the current pixel location, to a value of one (1). The running mean of the current pixel location 22 (RMPixel) is then determined in a step 114d as:

$$RM\text{Pixel}=((1-\text{Weight}M)*\text{Prev}RM\text{Pixel})+(\text{Weight}M*\text{Pixel}BC)$$

where:
PrevRMPixel is the running mean of the current pixel location 22 from a previous frame (e.g., the most recent frame); and
PixelBC is the brightness component (e.g., zero (0) to 255) of the current pixel location.

At this stage, since the frame 0 (Image 0) is currently being evaluated, the running mean weighting variable WeightM is one (1). Therefore, EW running mean of the current pixel location 22 (RMPixel) is:

$$RM\text{Pixel}=((1-1)*\text{Prev}RM\text{Pixel})+(1*\text{Pixel}BC)=\text{Pixel}BC.$$

In other words, the EW running mean of the current pixel location 22 (RMPixel) is the respective brightness component of the current pixel location 22. Therefore, the respective EW running mean for each of the pixel locations 22 (RMPixel) in the first frame (Image 0) is the brightness component of the respective pixel location 22 (PixelBC).

The EW running mean of the current pixel location 22 (RMPixel) is written to an EW running mean buffer for the current pixel location 22 in a step 114e. The step of setting (e.g., updating) the respective EW running mean for the current pixel location 22 ends in a step 114f.

Figure 6:
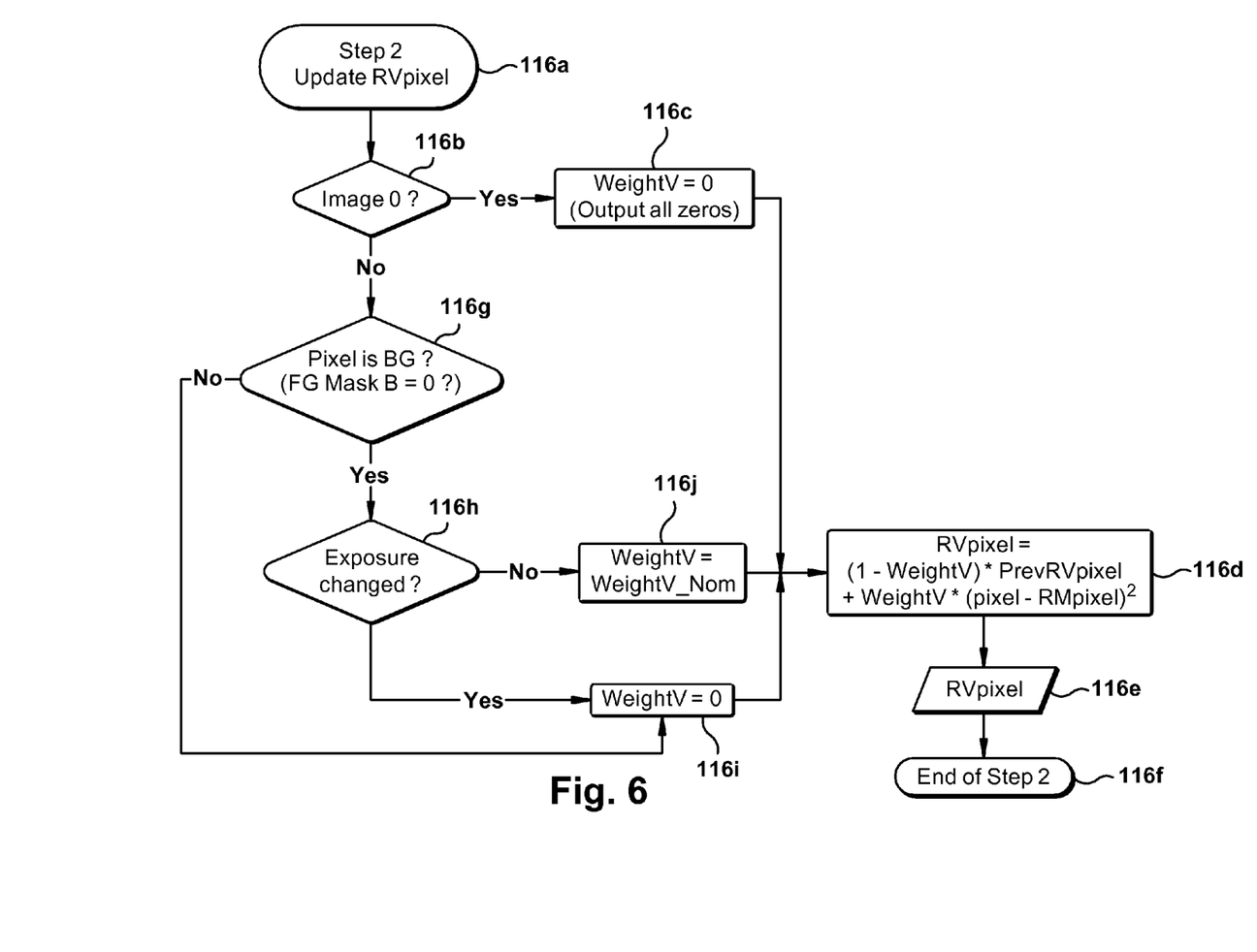

With reference to FIGS. 4 and 6, the step 116 of setting (e.g., updating) the respective EW running variance for the current pixel location 22 starts in a step 116a. A determination is made in a step 116b whether the current frame being evaluated is frame 0 (e.g., Image 0). Since, at this stage, the current frame is Image 0, control passes to a step 116c for assigning a running variance weighting variable, WeightV, which is used for determining the EW running variance of the current pixel location, to a value of zero (0). The running variance of the current pixel location 22 (RVPixel) is then determined in a step 116d as:

$$RVPixel=((1-WeightV)*PrevRVPixel)+(WeightV*PixelVar)$$

where:
PrevRVPixel is the running variance of the current pixel location 22 from a previous frame (e.g., the most recent frame); and
PixelVar is the instantaneous variance of the brightness component (e.g., zero (0) to 255) of the current pixel location with respect to the background value. The instantaneous variance is:

$$PixelVar=(PixelBC-RMPixel)^2$$

where:
PixelBC is the brightness component of the current pixel location; and
RMPixel is the EW running mean value at the current pixel location At this stage, since the first frame (Image 0) is currently being evaluated, the running variance weighting variable WeightV is zero (0). Therefore, running variance of the current pixel location 22 (RVPixel) is:

$$RVPixel=((1-0)*PrevRVPixel)+(0*PixelVar)=PrevRVPixel.$$

Since the first frame (Image 0) is currently being evaluated, there have been no previous frames, and the running variance of the current pixel location 22 from a previous frame is assumed to be zero (0). Therefore, the respective running variance for each of the pixel locations 22 (RVPixel) in the frame 0 (Image 0) is zero (0).

The running variance of the current pixel location 22 (RVPixel) is written to an EW running variance buffer for the current pixel location 22 in a step 116e. The step of setting (e.g., updating) the respective EW running variance for the current pixel location 22 ends in a step 116f.

Figure 7:
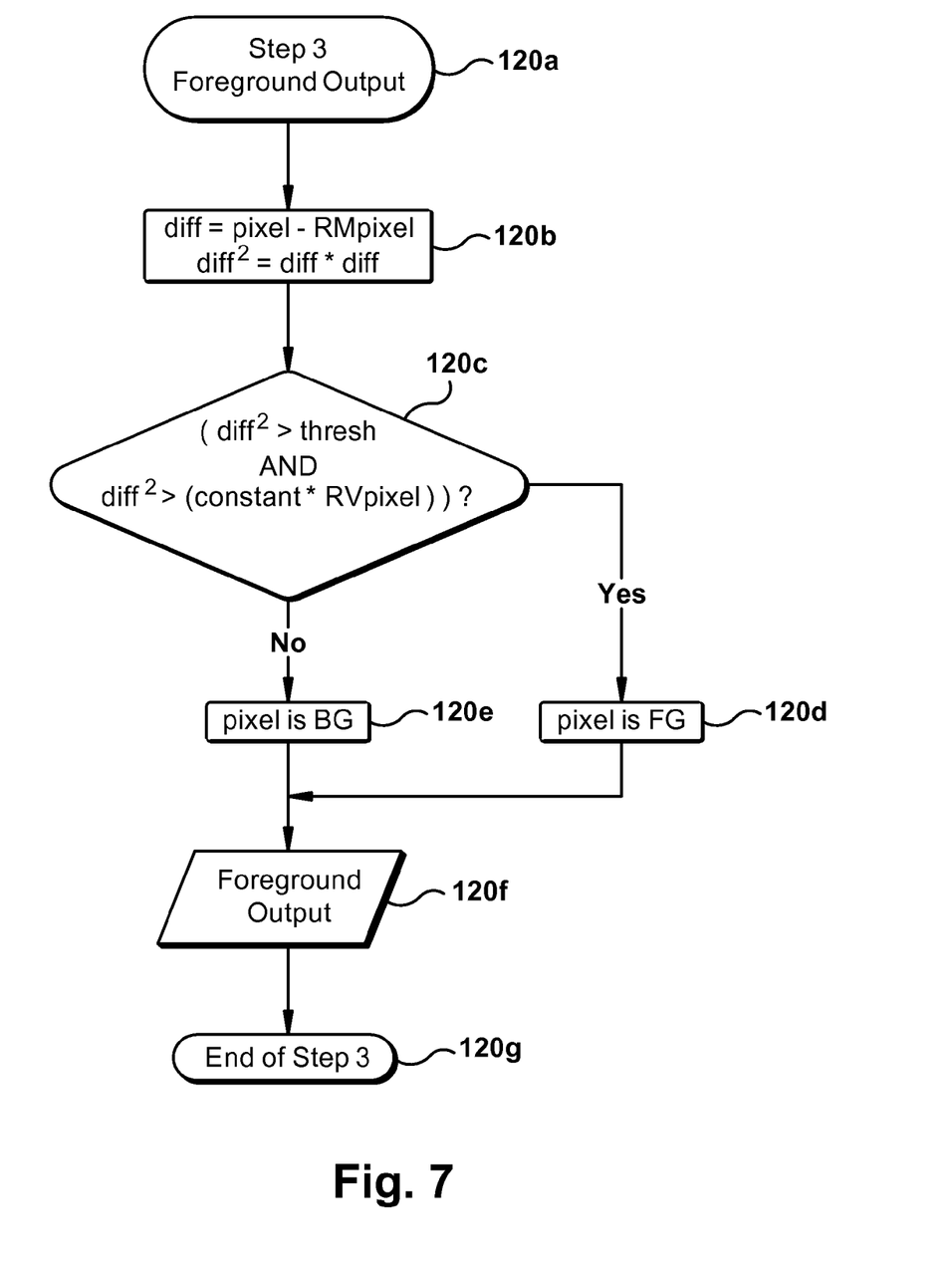

With reference to FIGS. 4 and 7, the step 120 of determining if the respective pixel location 22 is a "foreground pixel" or a "background pixel" starts in a step 120a. A squared difference ($diff^2$) is determined in a step 120b as:

$$diff^2=(PixelBC-RMPixel)^2$$

where:
PixelBC is the brightness component (e.g., zero (0) to 255) of the current pixel location; and
RMPixel is the EW running mean of the current pixel location 22.

A determination is made in a step 120c whether i) the squared difference ($diff^2$) is greater than a predetermined threshold (e.g., 100 to 300) and ii) the squared difference ($diff^2$) is greater than a constant (e.g., 5 to 10) times the running variance of the current pixel location 22 (RVPixel).

In the case when Image 0 is being evaluated, RMPixel=PixelBC for every pixel, so $diff=0$ and $diff^2=0$. Since any meaningful threshold is greater than zero (0), $diff^2=0$ is less than any meaningful threshold and all pixel locations are determined to be background pixel locations. In the case when any image other than Image 0 is being evaluated, if it is determined in the step 120c that i) the squared difference ($diff^2$) is greater than the predetermined threshold and ii) the squared difference ($diff^2$) is greater than the constant times the running variance of the current pixel location 22 (RVPixel), the current pixel location 22 is identified as a "foreground pixel" (e.g., the pixel location is identified by a numerical value of one (1)) in a step 120d. Otherwise, the current pixel location 22 is identified as a "background pixel" (e.g., the pixel location is identified by a numerical value of zero (0)) in a step 120e.

If the current pixel location 22 is a foreground pixel (e.g., the current pixel location 22 has a value of one (1)), the current foreground pixel 22 is output (e.g., added) to a foreground mask of the current frame in a step 120f. As noted above, in the frame 0 (e.g., Image 0), all of the pixel locations are assumed to be identified as background pixels. The step of determining if the respective pixel location 22 is a "foreground pixel" or a "background pixel" ends in a step 120g.

Figure 9:
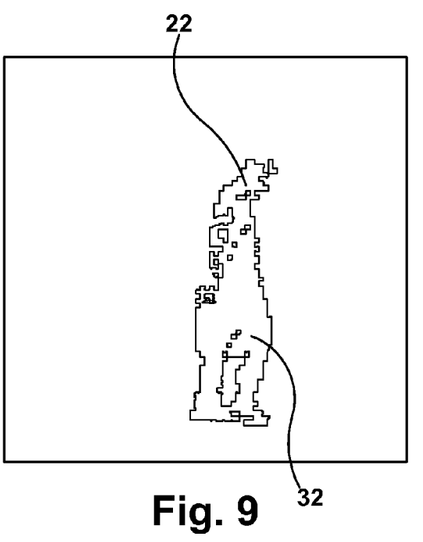
FIG. 9 illustrates a foreground object identified in an image in accordance with one embodiment of the present invention.

With reference to FIG. 4, once each of the steps 114, 116, and 120 is completed for each of the pixel locations 22 in the current image (e.g., Image 0), in a step 122 the respective EW running means of each of the pixel locations 22 (RMPixel) in the current image are stored in a memory 30 electrically communicating with the ECU 20, the respective EW running variances of each of the pixel locations 22 (RVPixel) in the current image are stored in the memory 30, and the pixel locations 22 identified in the current image as foreground pixel locations are stored in the memory 30 as a Foreground Mask A 32 (see FIG. 9).

In a step 124, a boundary box is determined. Since the boundary box is relevant when foreground pixel locations have been identified and the current example for the Image 0 does not include any foreground pixel locations, the step 124 will be described in more detail below.

After the step 124, if additional frames (e.g., images) are available that have not yet been evaluated, control returns to the step 114 for processing the additional frame(s). In the present example, since only frame 0 (Image 0) has been processed, the next frame (e.g., frame 1 or Image 1) (see FIG. 3) will be evaluated.

With reference to FIGS. 1-5, the step 114 begins in the step 114a. In the step 114b, it is determined that the current image is not frame 0 (Image 0) and, therefore, control passes to a step 114g for determining if the current pixel location 22 in the current image (e.g., Image 1) is a background pixel (e.g., if the Foreground Mask A value is zero (0)). If it is determined that the current pixel location 22 is a background pixel, control passes to a step 114h, for determining if an exposure of the image capturing device 12 has significantly changed. If the exposure of the image capturing device 12 has significantly changed, control passes to a step 114i for setting the running mean weighting variable WeightM to a predetermined value WeightM_ExpBG (e.g., 0.10 to 0.30) when the exposure has changed. The predetermined value WeightM_ExpBG (e.g., 0.10 to 0.30) will be larger than the value WeightM_Nom (e.g., 0.01-0.05), which will allow the EW running mean values to adjust more quickly to the effect of the exposure change.

If it is determined in the step 114h that the exposure has not significantly changed, control passes to a step 114j for determining if the current pixel location was changed in the previous image (e.g., Image 0) from a foreground pixel (e.g., Foreground Mask A of one (1)) in the image before the prior image (e.g., two (2) images prior to the current image) to a background pixel (e.g., Foreground Mask A of zero (0)) in the previous image (e.g., Image 0 in the present example). If it is determined in the step 114*j* that the current pixel location was changed, control passes to a step 114*k* for setting the running mean weighting variable WeightM to a predetermined value WeightM_FGtoBG (e.g., 0.10 to 0.30). The predetermined value WeightM_FGtoBG (e.g., 0.10 to 0.30) will be larger than the value WeightM_Nom (e.g., 0.01-0.05), which will allow the EW running mean values to adjust more quickly to changes in brightness during the time that the pixel location was labelled as foreground. Otherwise, if it is determined in the step 114*j* that the current pixel location was not changed, control passes to a step 114*l* for setting the running mean weighting variable WeightM to a predetermined value WeightM_Nom (e.g., 0.01-0.05).

If it is determined in the step 114*g* that the current pixel location 22 in the current image (e.g., Image 1) is not a background pixel (e.g., if the Foreground Mask A value is zero (0)), control passes to a step 114*m* for determining if the exposure of the image capturing device 12 significantly changed. If it is determined in the step 114*m* that the exposure of the image capturing device 12 has significantly changed, control passes to a step 114*n* for setting the running mean weighting variable WeightM to the predetermined value WeightM_ExpFG (e.g., 0.10 to 0.30). The predetermined value WeightM_ExpFG will be similar to or smaller than the value WeightM_Nom. Otherwise, if it is determined in the step 114*m* that the exposure of the image capturing device 12 has not significantly changed, control passes to a step 114*o* for setting the running mean weighting variable WeightM to 0.

From each of the steps 114*c*, 114*i*, 114*k*, 114*l*, 114*n*, 114*o*, control passes to the step 114*d* for determining the EW running mean of the current pixel location 22 (RMPixel), which is described above.

With referenced to FIGS. 4 and 6, after the running mean is set (e.g., updated) in the step 114, control passes to the step 116 for setting (e.g., updating) the respective EW running variance for the current pixel location 22. As discussed above, the step 116 starts at the step 116*a*. For the current frame (e.g., frame 1), it is determined in the step 116*b* that the current image (e.g., Image 1) is not Image 0 and, therefore, control passes to a step 116*g* for determining if the current pixel location 22 in the current image (e.g., Image 1) is a background pixel (e.g., if the Foreground Mask B value is zero (0)). If it is determined in the step 116*g* that the current pixel location 22 is a background pixel, control passes to a step 116*h* for determining if the exposure of the image capturing device 12 has significantly changed since, for example, the last frame; otherwise control passes to a step 116*i*. If it is determined in the step 116*h* that the exposure has not significantly changed, control passes to a step 116*j* for setting the running variance weighting variable WeightV to a predetermined value WeightV_Nom (e.g., 0.01-0.05) before passing to the step 116*d*, which is described above. Otherwise, if it is determined that the exposure has significantly changed, control passes to the step 116*i* for setting the running variance weighting variable WeightV to zero (0) before passing to the step 116*d*.

Control then passes to the steps 120 and 122 as discussed above.

With reference to FIG. 9, the pixel locations 22 identified as foreground pixels (assigned a numerical value of one (1) in the step 120*d* (see FIG. 7)) in the Foreground Mask A 32 are illustrated as white (see, for example the pixel location 22$_F$), while the pixel locations 22 identified as background pixel locations (assigned a numerical value of zero (0) in the step 120*e* (see FIG. 7)) in the Foreground Mask A 32 are illustrated as black (see, for example the pixel location 22$_B$). As illustrated in FIG. 9, not all of the pixel locations 22 within a silhouette (e.g., outline) of the object 16 are identified as foreground pixel locations 22$_F$. In other words, not all of the pixel locations 22 within the silhouette of the 16 are white. Therefore, with reference to FIGS. 4, 7, and 8, respective shapes (e.g., a rectangle, square, circle, oval, ellipse, parallelogram, etc.) 34 are defined around the objects 16 in the step 124. In one embodiment, the shape 34 is referred to as the bounding box.

Figure 8:
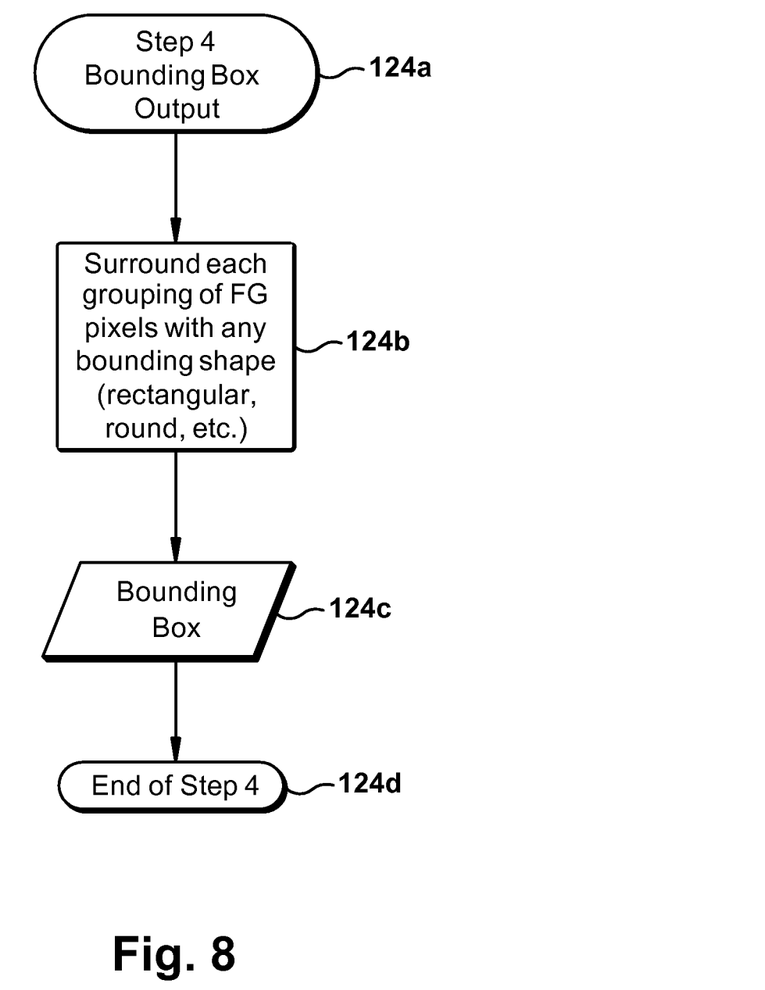
Figure 10:
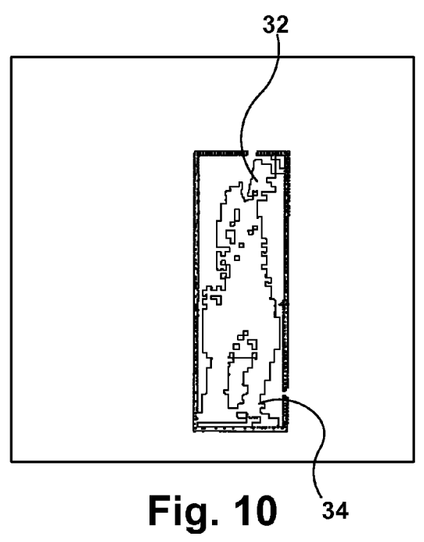
FIG. 10 illustrates a silhouette around the identified foreground object in the image in accordance with one embodiment of the present invention.
Figure 11:
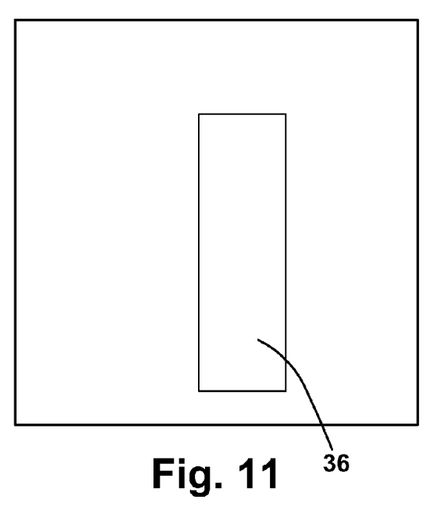
FIG. 11 illustrates an identification of the image pixels within the silhouette area in the image in accordance with one embodiment of the present invention.

With reference to FIGS. 4 and 8, the step 124 of defining respective shapes around the objects starts at a step 124*a*. In a step 124*b*, each grouping of foreground pixel locations 22$_F$ is surrounded by the shape 34 (see the rectangle in FIGS. 10 and 11). Then, in a step 124*c*, each of the pixel locations within the boundary of the shape 34 is set as a foreground pixel location 22$_F$ (e.g., set to have a value of one (1) so that the pixel location is illustrated as white) to form the bounding shape 36 (e.g., bounding box). The bounding box 36 defines a Foreground Mask B. The step of defining respective shapes around the objects ends at a step 124*d*.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for processing image data, the method comprising:

identifying a background scene in a background frame of an image;

setting each of a plurality of pixel locations in the background frame as a respective background pixel;

for each of the pixel locations, determining a respective running mean and a respective running variance based on a brightness component of the background frame at the pixel location;

identifying a subsequent frame as a current frame;

determining a mean weight associated with the current frame based on exposure settings of an image capturing device significantly changing;

for each of the pixel locations in the current frame identified as a background pixel:

determining a pixel mean weight based on whether one of the current pixel location changed in the current frame from a foreground pixel to a background pixel and the current pixel location did not change in the current frame from a foreground pixel to a background pixel;

updating the running mean based on one of the mean weight and the pixel mean weight;

updating the running variance based on one of a plurality of variance weights;

for each of the pixel locations in the current frame:

identifying if the current pixel location is one of a background pixel and a foreground pixel based on a brightness component of the current pixel location in the current frame, a current running mean of the current pixel location, and a current running variance of the current pixel location; and updating the running mean for the current pixel locations identified as a foreground pixel.

2. The method for processing image data as set forth in claim 1, further including:

repeating the step of identifying a subsequent frame as a current frame along with the steps of updating the running mean, and updating the running variance for each of the pixel locations in the current frame.

3. A method for processing image data, the method comprising:

identifying a background scene in a background frame of an image;

setting each of a plurality of pixel locations in the background frame as a respective background pixel;

for each of the pixel locations, determining a respective running mean and a respective running variance based on a brightness component of the background frame at the pixel location;

identifying a subsequent frame as a current frame;

determining a variance weight associated with the current frame based on exposure settings of an image capturing device significantly changing;

for each of the pixel locations in the current frame identified as a background pixel:
 determining a pixel variance weight based on an exposure associated with the current frame;
 updating the running mean based on one of a plurality of mean weights;
 updating the running variance based on one of the variance weight and the pixel variance weight;

for each of the pixel locations in the current frame:
 identifying if the current pixel location is one of a background pixel and a foreground pixel based on a brightness component of the current pixel location in the current frame, a current running mean of the current pixel location, and a current running variance of the current pixel location.

4. The method for processing image data as set forth in claim 3, wherein the step of updating the running mean includes updating the running mean according to:

$RM\text{Pixel} = ((1-\text{Weight}M)*\text{Prev}RM\text{Pixel}) + (\text{Weight}M*\text{Pixel}BC)$, where: RMPixel is the updated running mean for the current pixel location in the current frame;
WeightM is a current mean weight for the current pixel location in the current frame;
PrevRMPixel is the running mean of the current pixel location from a previous frame; and
PixelBC is the brightness component of the current pixel location in the current frame.

5. The method for processing image data as set forth in claim 3, wherein updating the running variance based on the variance weight includes updating an instantaneous variance according to:

$\text{PixelVar} = (\text{Pixel}BC - RM\text{Pixel})^2$ where: PixelBC is the brightness component of the current pixel location; and
RMPixel is the current running mean value at the current pixel location.

6. The method for processing image data as set forth in claim 5, wherein the step of updating the running variance based on a current pixel variance weight includes updating the running variance according to:

$RV\text{Pixel} = ((1-\text{Weight}V)*\text{Prev}RV\text{Pixel}) + (\text{Weight}V*\text{PixelVar})$, where: RVPixel is the updated running variance for the current pixel location in the current frame;
WeightV is the running variance for the current pixel location in the current frame;
PrevRVPixel is the running variance of the current pixel location from a previous frame; and
PixelVar is an instantaneous variance of the brightness component of the current pixel location with respect to a background value.

7. The method for processing image data as set forth in claim 3, wherein the step of identifying if the current pixel location is one of a background pixel and a foreground pixel includes identifying if the current pixel location is one of a background pixel and a foreground pixel according to:

$\text{diff}^2 = (\text{Pixel}BC - RM\text{Pixel})^2$, where: PixelBC is the brightness component of the current pixel location in the current frame; and
RMPixel is the updated running mean for the current pixel location in the current frame; and
identifying if the current pixel location is one of a background pixel and a foreground pixel based on $\text{diff}^2$.

8. The method for processing image data as set forth in claim 7, wherein the step of identifying if the current pixel location is one of a background pixel and a foreground pixel includes identifying if the current pixel location is the foreground pixel if:

$\text{diff}^2 >$ a predetermined threshold; and
$\text{diff}^2 > (k*RV\text{Pixel})$, where: RVPixel is the updated running variance for the current pixel location in the current frame; and
k is a constant.

9. The method for processing image data as set forth in claim 3, further including:

identifying a bounding box surrounding a group of the foreground pixel locations;
identifying each of the pixel locations within the bounding box as a foreground pixel for updating the running variance.

10. The method for processing image data as set forth in claim 9, further including:

defining the bounding box as any geometric shape.

* * * * *